(12) United States Patent
McIntosh

(10) Patent No.: US 6,471,184 B1
(45) Date of Patent: Oct. 29, 2002

(54) SPRING ASSISTED ELECTRIC/ELECTRONIC GLOBE CONTROL VALVE

(76) Inventor: Douglas S. McIntosh, #505-373 Laurier East, Ottawa, Ontario (CA), K1S 2C5

( * ) Notice: Subject to any disclaimer, the term of this patent is extended or adjusted under 35 U.S.C. 154(b) by 0 days.

(21) Appl. No.: 09/912,972

(22) Filed: Jul. 25, 2001

(51) Int. Cl.[7] .................................. F16K 1/00
(52) U.S. Cl. ...................... 251/321; 251/248; 251/250; 251/129.02
(58) Field of Search ................ 251/250, 248, 251/321, 129.02

(56) References Cited

U.S. PATENT DOCUMENTS

| | | | | |
|---|---|---|---|---|
| 148,969 A | * | 3/1874 | Moore | 251/250 |
| 265,168 A | * | 9/1882 | Solis | 251/250 |
| 305,084 A | * | 9/1884 | Lawson | 251/250 |
| 353,802 A | * | 12/1886 | Mortimer | 251/250 |
| 710,959 A | * | 10/1902 | Engelhard | 251/250 |
| 824,442 A | * | 6/1906 | Schlemmer | 251/250 |
| 1,497,946 A | * | 6/1924 | Schmidt | 251/250 |
| 1,573,210 A | * | 2/1926 | Whidden | 251/250 |
| 1,626,089 A | * | 4/1927 | Jakosky | 251/250 |
| 3,058,718 A | * | 10/1962 | Johnson | 251/214 |
| 4,084,786 A | * | 4/1978 | Walters | 251/250 |
| 4,384,591 A | * | 5/1983 | Tan | 137/322 |
| 4,836,497 A | * | 6/1989 | Beeson | 251/80 |
| 5,529,282 A | * | 6/1996 | Lebkuchner et al. | 251/129.12 |
| 5,941,500 A | * | 8/1999 | Lebkuchner | 251/77 |
| 6,032,924 A | * | 3/2000 | Castle | 251/129.12 |

FOREIGN PATENT DOCUMENTS

| | | | | |
|---|---|---|---|---|
| CZ | 400892 | * | 11/1933 | F16K/31/44 |
| DE | 848014 | * | 6/1952 | F16K/31/44 |
| FR | 791343 | * | 12/1935 | F16K/31/44 |

* cited by examiner

Primary Examiner—Lesley D. Morris
Assistant Examiner—Frederick C. Nicolas
(74) Attorney, Agent, or Firm—Francis C. Hand; Carella, Byrne, Bain et al.

(57) ABSTRACT

A globe valve system for controlling the flow of fluid in a pipe comprises a pipe receiving body having within a fluid passage, a valve seat and a globe valve plug movable between an open position allowing fluid flow through the passage and seat a closed position blocking the fluid flow as actuator have the valve plug between the open and closed positions and a spring assists the valve plug in moving from the open to the closed position.

5 Claims, 2 Drawing Sheets

SPRING ASSISTED ELECTRIC/ELECTRONIC GLOBE CONTROL VALVE

FIELD OF THE INVENTION

The present invention relates to an improved construction for electrically actuated globe control valves used, for example in water based heating and cooling systems for buildings.

BACKGROUND OF THE INVENTION

Generally speaking, fluid control valves for such heating and cooling systems evolved from pneumatically driven valves, and therefore, most engineering and pressure calculations evolve from the application of pneumatic actuators opposing springs and of course the valve stem and valve plug. A pneumatic actuator works only in one direction. Air pressure opposes the force of the valve plug against the seat and an additional spring is added both to oppose the actuator when there is no differential pressure across the valve, and also to bias the valve so that the valve will work within the operating range of the pneumatic controller. When electric actuators were added to the valves to replace pneumatic ones, that thinking, (the force calculations, etc., along with the spring, etc.), was forgotten since the electric actuators work in both directions.

When electric and electronic actuators are applied, they have the ability to apply equal force in either direction. They are also usually much more expensive than their pneumatic counterparts. As the industry applies them conventionally, they work hard to close the globe valve plug against its seat and the differential pressure of the fluid. In the return direction, the motors do virtually no work. In fact, they are pushed off the seat by the differential force of the fluid against the plug. Clearly, half the work is being wasted.

One current and common approach towards attaining improved close-off differential pressures is to apply a "balanced" globe valve, but such valves are expensive to produce and have an inherent minimal leakage factor often undesirable and wasteful of energy in the closed position. These valves, "double seated valves", have two plugs and two seats, one set closing with the pressure and one set closing against the pressure. Accordingly, they are also expensive. Another type has a hole from beneath the seat to above a piston at the top of the valve, to push down the seat with a force equal to the upward force. These valves are susceptible to dirt and shavings, and seals which wear and leak.

It is an object of the present invention to provide a construction which will improve the close-off pressures of electrically and electronically motorized globe valves.

SUMMARY OF THE INVENTION

In accordance with the present invention there is provided a globe valve system for controlling the flow of fluid in a pipe, the system comprising a pipe-receiving body having within it a fluid passage, a valve seat and a globe valve plug movable between an open position allowing fluid flow through the passage and seat and a closed position blocking said fluid flow. Means are provided to move the valve plug between open and closed position. A biasing means is also provided, to assist the valve plug in moving from open to close position.

In a preferred embodiment of the present invention, the biasing means comprises a compression spring, the force of which balances the force against the valve plug as it closes.

By providing a bias which offsets the force operating against the actuator as it closes the valve, the close off pressure can be doubled (less the spring rate and the valve friction). In this case, the actuator will have to work in both directions, to compress the compression spring as the valve is opened, and to close the valve.

BRIEF DESCRIPTION OF THE DRAWINGS

These and other objects and advantages of the invention will become apparent upon reading the following detailed description and upon referring to the drawings in which.

Figure 1:
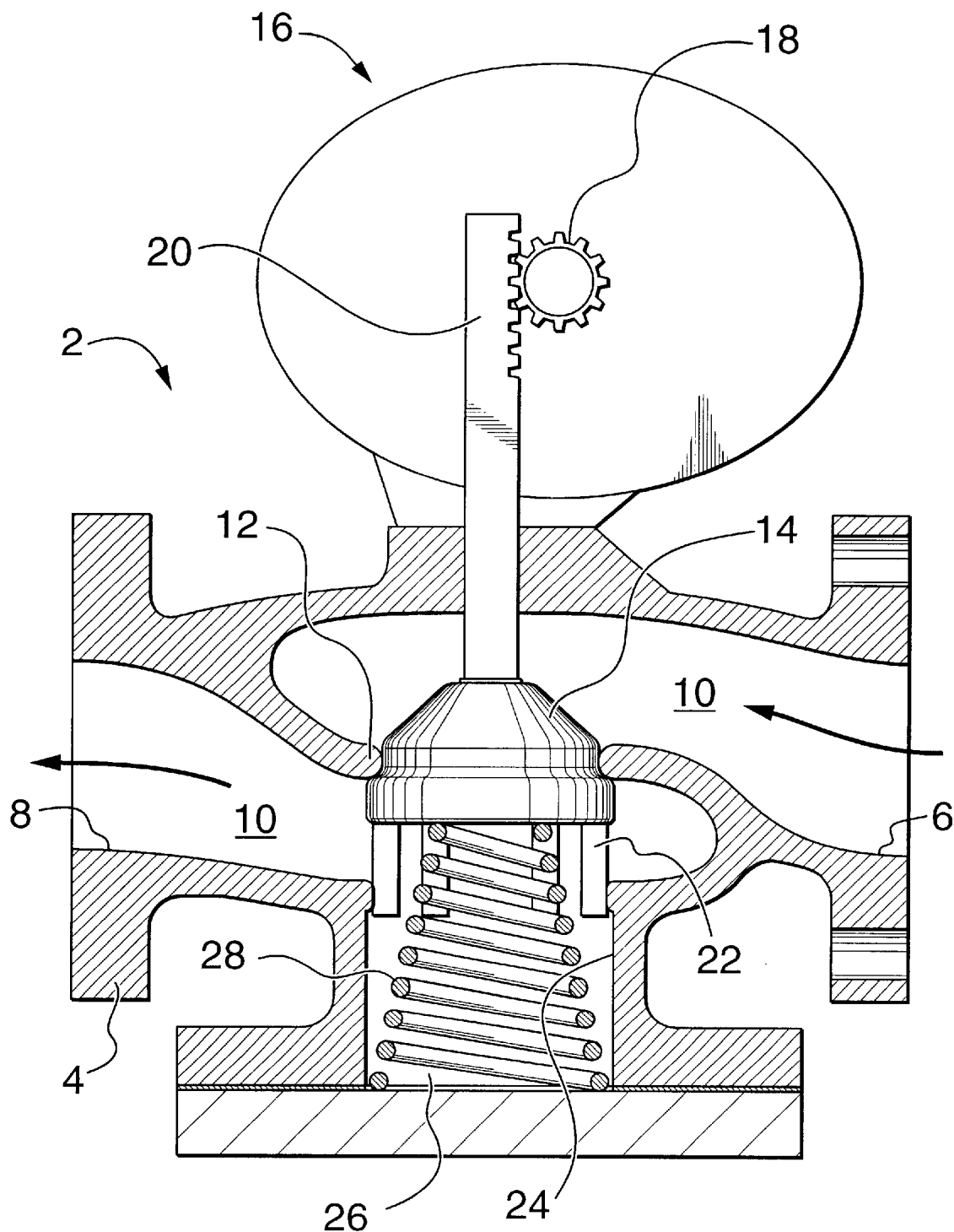
FIG. 1 is a section, schematic view of a spring assisted globe valve system according to the present invention, as applied to an unbalanced single seated reverse acting valve.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1 there is illustrated a motorized globe valve system 2 in accordance with the present invention. The valve system comprises a pipe-receiving body 4 having a fluid inlet 6 and a fluid outlet 8, and a passage 10 between the inlet and outlet. Within the passage 10 is a valve seat 12 and a globe valve plug 14, the plug being movable between an open position allowing fluid flow through the passage 10 and seat 12, and a closed position (as illustrated) on the seat, blocking the flow of fluid. A motor driven actuator 16, controlled by appropriate means (not illustrated) governs the positioning of valve plug 14 with respect to seat 12 through, for example, an appropriate gear mechanism 18 acting on stem 20 upwardly extending from valve plug 14 and passing through body 4 as illustrated. A stem guide 22 may be provided, as illustrated, to cooperate with walls 24 of well 26 directly below valve plug 14, to insure proper vertical movement between open and closed position of valve plug 14.

Figure 2:
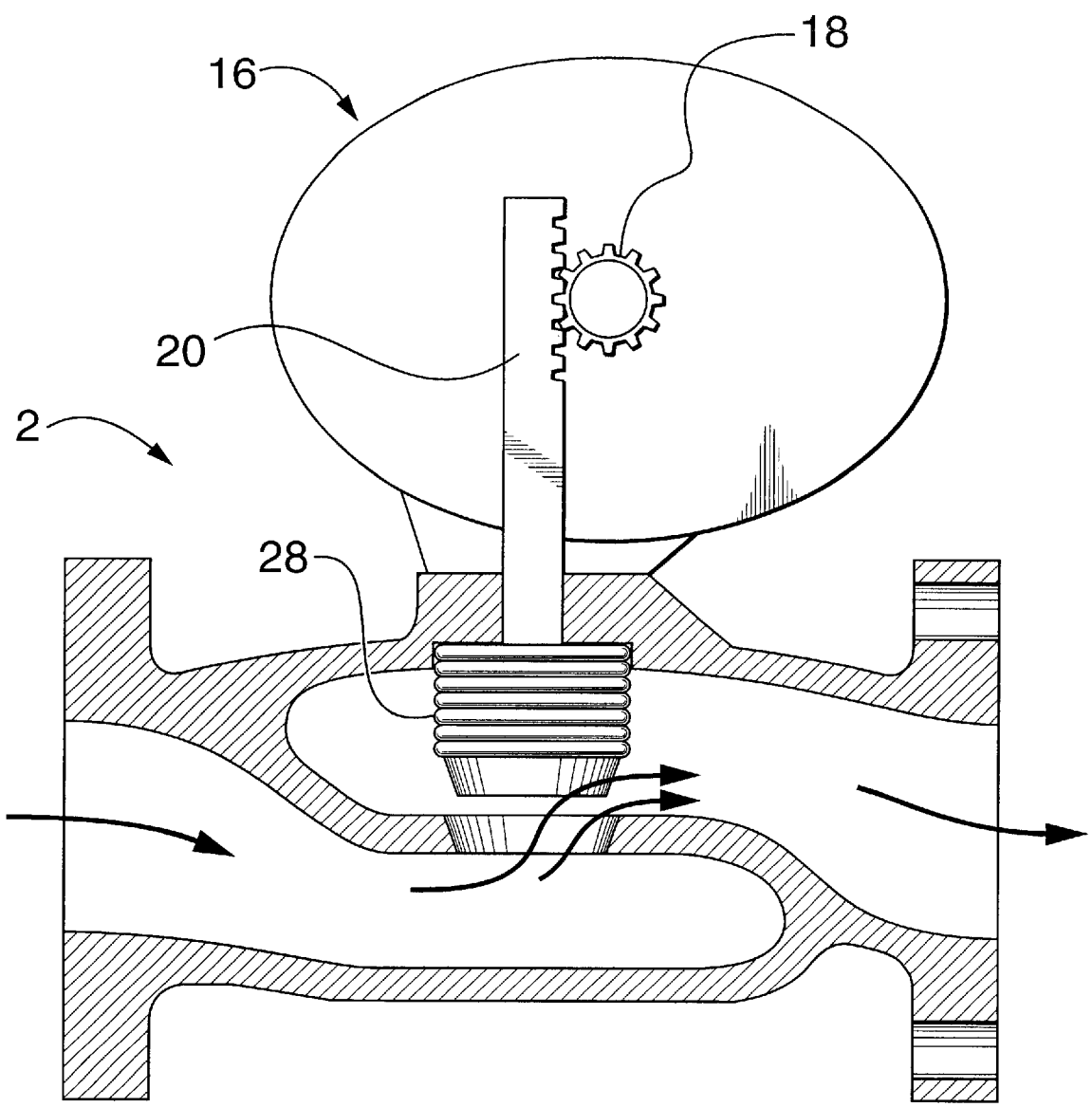
FIG. 2 is a schematic section view of the an alternative embodiment of a spring assisted valve according to the present invention applied to a direct acting valve.

A compression spring 28 is positioned within well 26, under the seat of the valve plug 14 as illustrated, so that there is upward force applied against the valve plug 14, to assist the actuator 16 as the valve plug 14 is moved to the closed position. The force of spring 28 is intended to be the equal of the actuator as it moves, unassisted to the closed position. In this manner, the close off pressure is doubled (less the spring rate and the valve friction). Actuator 16 however must work as the valve plug 14 is moved to the open position in the downward direction, as the compression spring is compressed In FIG. 2 there is illustrated an alternative embodiment of the present application as applied to a direct acting globe valve in which actuator 16 pushes valve plug 14 downwards into closed position. In this case spring 28 is positioned above valve plug 14 as shown.

OPERATION

By way of example, in the embodiment of FIG. 1, based on the size of the globe valve plug (14) (approximately 3 inches in a 3 inch globe valve), the valve plug has an area of approximately 7 square inches. Since it is desired to attain a close off pressure of 50 psi, a force of 50×7 or 350 pounds is required. Having an actuator rated for 200 pounds, a force of only 200 divided by 7 or 28½ psi close off differential pressure can be achieved. However, the addition of a biasing spring of 200 pounds force would add another 28½ pounds of close off force, or 57 psi differential pressure. Because the spring rate of the spring would lose tension as it relaxed, about 25 pounds of force is lost at its relaxed end. Add to that 5 pounds for friction and the weight of the internals, this results in only 170 pounds being available to do the work, the total then being 170 plus 200 or 370 pounds, which is able to oppose 370 divided by 7=52½ psi. The valve plug (14) can still be closed off within the psi differential pressure required for close off pressure.

In this application the actuator, when opening the valve, now has work to do, namely the recompressing of the spring. Because this work does not exceed the rating of the actuator (200 pounds), no difficulty is encountered.

In this application, at the cost of a simple compression spring, a smaller actuator is able to be used at considerable saving, while the cost of the spring is minimal. The control valve specification as a whole is considerably enhanced. Furthermore, the undesirable minimal leakage factor of the more normal "balanced" globe valves does not apply in this improvement.

It will be understood that the spring 28 could be applied to the actuator itself, biasing it to one direction (up; down, open; closed, etc.) and in this application it could be added to assist actuators in all applications (spring loaded dampers, off balance loads, gravity biased loads, etc.), and so would help in the application of actuators to dampers, lifting actuators etc.

Thus, it is apparent that there has been provided in accordance with the invention a spring assisted globe valve that fully satisfies the objects, aims and advantages set forth above. While the invention has been described in conjunction with illustrated embodiments thereof, it is evident that many alternatives, modifications and variations will be apparent to those skilled in the art in light of the foregoing description.

What I claim as my invention:

1. A valve system comprising
    a pipe-receiving body having a fluid inlet for receiving a fluid under pressure, a fluid outlet, a passage between said inlet and said outlet and an annular valve seat within said passage;
    a valve body disposed on a fluid outlet side of said valve seat, said valve body being movable between a closed position seated on said valve seat to close off a flow of fluid from said fluid inlet through said valve seat to said fluid outlet under the pressure of the fluid in said fluid inlet and an open position spaced from said valve seat to allow a flow of fluid from said fluid inlet through said valve seat and past said valve body to said fluid outlet;
    a spring disposed in said body in abutment with said pipe-receiving body for biasing said valve body under a predetermined spring force into said closed position on said valve seat against the pressure of the fluid in said fluid inlet; and
    a motor driven actuator connected to said valve body for moving said valve body between said open position and said closed position under a predetermined actuating force, said predetermined force of said actuator being greater than said predetermined spring force whereby said actuator compresses said spring upon moving said valve body from said closed position to said open position and whereby said actuator and said spring move said valve body from said open position to said closed position under the additive force of said predetermined spring force and said predetermined force of said actuator and against the pressure of the fluid in said fluid inlet.

2. A valve system as set forth in claim 1 wherein said predetermined spring force is 200 pounds and said predetermined force of said actuator is 200 pounds.

3. A valve system as set forth in claim 1 wherein said spring is a compression spring.

4. A valve system as set forth in claim 1 wherein said actuator includes a reciprocably mounted stem secured to said valve body on an opposite side from said spring.

5. A valve system as set forth in claim 1 wherein said actuator includes a reciprocally mounted stem secured to said valve body on the same side as said spring.

* * * * *